United States Patent [19]

Joly et al.

[11] Patent Number: 5,821,397

[45] Date of Patent: *Oct. 13, 1998

[54] PROCESS FOR THE HYDROGENATION OF DIOLEFINS IN AROMATIC-RICH HYDROCARBONS USING METALLIC CATALYSTS IMPREGNATED WITH ORGANIC SULPHUR-CONTAINING COMPOUNDS

[75] Inventors: Jean-François Joly; Charles Cameron, both of Paris; Jean Cosyns, Maule; Gérard Leger, Caluire; Pierre Renard, Saint Nom La Breteche; Françoise Montecot, Les Clayes Sous Bois, all of France

[73] Assignee: Institut Francais du Petrole, France

[*] Notice: This patent issued on a continued prosecution application filed under 37 CFR 1.53(d), and is subject to the twenty year patent term provisions of 35 U.S.C. 154(a)(2).

[21] Appl. No.: 593,410

[22] Filed: Jan. 29, 1996

[30] Foreign Application Priority Data

Jan. 27, 1995 [FR] France ................................. 95 00977

[51] Int. Cl.⁶ ........................... C07C 7/163; C07C 5/03; C07C 5/08
[52] U.S. Cl. ..................... 585/262; 585/258; 585/259; 585/260; 585/273; 585/277
[58] Field of Search .................... 585/258, 259, 585/261, 262, 263, 273, 277

[56] References Cited

U.S. PATENT DOCUMENTS

| 3,715,404 | 2/1973 | Lindlar et al. ................... 260/642 |
|---|---|---|
| 4,145,276 | 3/1979 | Cosyns et al. ..................... 208/57 |
| 4,172,027 | 10/1979 | Ham et al. ........................ 208/140 |

FOREIGN PATENT DOCUMENTS

| 466567 | 1/1992 | European Pat. Off. . |
|---|---|---|
| 636677 | 7/1994 | European Pat. Off. . |
| 623387 | 11/1994 | European Pat. Off. . |
| 2053959 | 7/1980 | United Kingdom . |

*Primary Examiner*—Bekir L. Yildirim
*Attorney, Agent, or Firm*—Millen, White, Zelano & Branigan, P.C.

[57] ABSTRACT

A process is described for the high-efficiency selective hydrogenation of an aromatic hydrocarbon cut which also contains monoolefinic hydrocarbons and polyolefinic and/or acetylenic hydrocarbons with a bromine number of 10000 to 100 mg per 100 g of product with an aromatic degree of conversion which is limited to a maximum of 0.15% by weight, the process being characterized in that the cut, which is at least partially in the liquid phase, is passed with hydrogen into a hydrogenation zone in contact with a catalyst containing 0.1% to 1% by weight (with respect to the support) of palladium, the catalyst having been treated before activation with at least one organic sulphur-containing compound to introduce 0.05% to 1% of sulphur (by weight with respect to the weight of the catalyst), the process being carried out at a temperature in the range 20° C. to 25° C., at a pressure of 4–50 bar, a GHSV of 0.2–25 $h^{-1}$ and with a $H_2$/monoolefin +polyolefin and/or acetylenes ratio in the range 0.3 to 100.

18 Claims, No Drawings

PROCESS FOR THE HYDROGENATION OF DIOLEFINS IN AROMATIC-RICH HYDROCARBONS USING METALLIC CATALYSTS IMPREGNATED WITH ORGANIC SULPHUR-CONTAINING COMPOUNDS

BACKGROUND OF THE INVENTION

The present invention concerns a novel process for the treatment of hydrocarbon cuts which are rich in aromatic compounds, more particularly a process for the high-efficiency elimination of diolefins, possibly with reduction or elimination of monoolefins, from hydrocarbon mixtures which are rich in aromatic compounds, by a hydrogenation reaction using a particular catalyst, and practically without hydrogenation of the aromatic compounds.

Hydrocarbon mixtures which are rich in aromatic compounds are used in petrochemical plants where, after various separation and purification treatments, they produce, for example, benzene, toluene, ethylbenzene, styrene, etc . . .

Cuts which are rich in aromatic compounds and which contain variable amounts of diolefins and olefins are generally produced by processes for the distillation of crude hydrocarbons such as crude oil, natural gas condensate, or coal; thermal processes such as naphtha steam cracking; processes dedicated to the production of aromatics from light aliphatic cuts ($C_3$–$C_5$, more particularly $C_3$ and $C_3/C_4$), $C_6$ and $C_6/C_7$ aliphatics, and heavy naphtha cuts (>$C_6$ for various catalytic reforming processes); and processes for the transformation of aromatic products such as processes for the trans-alkylation and isomerisation of ortho-and meta-xylenes to para-xylene.

Catalytic reforming is the major process which produces the aromatic compound-rich mixtures. Originally, catalytic reforming was carried out in two types of facilities depending on its use in refining or for petrochemistry. Subsequently, this distinction, which was linked to the severity of the operating conditions, has become blurred.

Nowadays, in order to satisfy increased energy requirements, the industry is once again researching more specific processes. For refining, it thus uses catalytic reforming units which operate at high severity, but with greater stability of operation and improved yields of gasolines, and for petrochemistry the production of aromatics (benzene, toluene and xylenes) is optimised by using a reactor which operates at low pressure.

The use of reformers operating at high severity is accompanied by an increase in the olefin and diolefin content of the reformates. The bromine number of the stabilized reformate can reach a maximum value which exceeds 7 g of bromine per 100 g of product for units operating at very low pressure. The presence of these olefins and diolefins is particularly prejudicial to aromatic separation processes. As an example, olefins and diolefins tend to polymerize in the solvents used for the extractions. Purification treatments in current use employ activated natural silicoaluminates (for example, attapulgite, bentonites and montmorrillonites activated by treatment in the presence of acids). Those purification materials are generally termed activated clays.

The use of purification treatments using activated clay has a number of drawbacks, among which are: short lifetime (4 to 6 months in general, sometimes as low as 1 month for feeds with high concentrations of olefins, >0.6% by weight), low catalytic activity (GHSV between 0.5 and 3 volumes of feed/volume of catalyst/hour), and great difficulty in purifying feeds containing more than 1% by weight of olefins and diolefins, thus limiting the severity of operation of the reformer. Purification of the feed is accompanied by the production of high molecular weight compounds by alkylation of the aromatics. These products must then be separated. Further, the use of activated clays poses severe problems as regards environmental protection. They cannot be regenerated economically and are thus deposited into the waste with residual toxic aromatic products.

We have thus searched for a process which can purify mixtures of hydrocarbons which are rich in aromatic compounds and which does not have the problems which are inherent in conventional treatments using activated clays as the purification system.

The skilled person is well aware that olefins and diolefins can be hydrogenated using catalysts based on at least one metal from group VIII deposited on an amorphous or crystalline support, the metal usually being platinum, palladium or nickel, for example.

The use of this type of catalyst for the hydrogenation of diolefins in olefinic cuts such as $C_3$ or $C_4$ steam cracking cuts or in olefinic and aromatic cuts such as steam cracking spirits and catalytic cracking spirits is known. In these processes, the aim is to hydrogenate the diolefins to monoolefins with minimal loss of the olefins. The conditions of temperature, partial pressure of hydrogen and residual olefin content permit efficient hydrogenation of the olefinic compounds while avoiding hydrogenation of the aromatic compounds.

German patent DE-1 190 127, for example, describes the hydrogenation of diolefins from pyrolysis gasolines using a catalyst based on palladium, chlorine and sodium treated with sulphuric acid. The bromine number after hydrogenation reduced from 29000 mg/100 g to 14800 mg/100 g, indicating a partial loss of olefins, and the diolefins content was reduced from 7.25% to 0.1% by weight. However, a loss of 3000 ppm of benzene was observed. Thus even under less severe hydrogenation conditions and even accepting the inconveniences of a high residual diolefin content, it is sometimes difficult to ensure a small loss, of less than 1500 ppm, of aromatic compounds.

The use of this type of catalyst for the hydrogenation of diolefins and possibly olefins present in hydrocarbon cuts which are rich in aromatic compounds is not possible, however, since higher temperature conditions and/or higher partial pressure of hydrogen and/or a much lower residual olefin content cannot prevent partial hydrogenation of the highly desirable aromatic compounds. These catalysts are, in fact, too active, since they hydrogenate olefins, diolefins and aromatic compounds. They are thus not selective which means that there is an unacceptable loss of aromatic compounds which is not acceptable in a petrochemical plant.

French patent FR-A-2 460 989 describes a process for the purification of an aromatic hydrocarbon cut containing olefinic and/or acetylenic hydrocarbons in the presence of catalysts containing palladium which have been pretreated with hydrogen sulphide ($H_2S$), hydrogen selenide ($H_2Se$) or hydrogen telluride ($H_2Te$). Addition of the second element to the palladium produces substantial differences compared with palladium alone. It has been shown that hydrogenation of an aromatic stabilized reformate-type cut can reduce the olefin content in the effluent from 2200 mg/100 g of product to 75 mg/100 g of product. When palladium alone is used as the catalyst, there is a large loss of aromatic compounds (21000 ppm). In contrast, the use of a catalyst which had been pretreated with $H_2S$ reduces the aromatic compound loss to 2000 ppm.

Sulphuration was carried out during the catalyst reduction step in the hydrogenation reactor in the presence of 3 mole % of $H_2S$ in hydrogen. The reaction was carried out at 250° C. for 2 hours. There were strong $H_2S$-palladium and $H_2S$-alumina interactions at the surface. Due to these strong interactions, the sulphuration front displaced with saturation of the catalyst from the first portion with sulphur, before the remainder of the catalytic bed could come into contact with the $H_2S$. This sulphuration method is highly efficient but the degree of sulphuration is not controllable and leads to a catalyst which is saturated with sulphur. Too much sulphur leads to a loss of catalytic activity since sulphur is known to be a powerful poison for palladium. Further, the interaction of $H_2S$ with the support leads to an increase in the acidity of the support. This latter is a principal causal agent of the oligomerisation of olefins and diolefins leading to the formation of gums and deactivation of the catalyst.

FR-A-2 664 610 describes a process for the hydrogenation of diolefins and possibly olefins in steam cracking gasolines which are rich in aromatic compounds. It was found that the process could be improved when it was carried out in the presence of a metallic catalyst impregnated with organic sulphur-containing compounds before charging into the reactor. Catalysts prepared by this route had a sulphur content which was uniform from grain to grain before charging into the reactor. The initial sulphur content could be controlled to improve the activity of the catalyst after reduction.

The introduction of organic compounds containing sulphur into the catalyst before charging it into the reactor was found to improve the selectivity of the hydrogenation reaction despite intermediate manipulation in air.

SUMMARY OF THE INVENTION

We have now sought an improved process for the selective high-efficiency hydrogenation of an aromatic hydrocarbon cut which also contains monoolefinic hydrocarbons, and preferably at most 0.3% by weight of polyolefinic and/or acetylenic hydrocarbons.

The term "improved process" means a process in which the conversion of aromatic compounds is limited to a maximum of 0.15% by weight, preferably to 0.10% by weight, while retaining or improving the hydrogenation of polyolefinic and/or acetylenic hydrocarbons.

The process can also partially hydrogenate monoolefins.

More precisely, in the improved process constituting the object of the invention, the cut, which is at least partially in the liquid phase, is passed with hydrogen into a hydrogenation zone in contact with a catalyst containing 0.1% to 1% by weight of palladium with respect to the support, the catalyst having been treated before activation with at least one organic sulphur-containing compound to introduce 0.05% to 1% of sulphur (by weight with respect to the weight of the catalyst), the process being carried out at a temperature in the range 20° C. to 250° C., at a pressure of 4–50 bar, a GHSV of 0.2–25 $h^{-1}$ and with a $H_2$/monoolefin +polyolefin and/or acetylenes ratio in the range 0.3 to 100.

The palladium content in the catalyst is in the range 0.1% to 1% by weight with respect to the support.

A variety of supports can be used: silica, alumina, silica-aluminas, aluminates, magnesium oxide, titanium oxide, and their mixtures. Charcoal can also be used. Examples of aluminates are aluminates of elements from groups IA, IIA, IIB, such as aluminates of Ca, Mg, Ba, Zn, Na, K, Cd and mixed aluminates.

The support is preferably an alumina with an initial specific surface area (before incorporation of the palladium and before activation) generally in the range 1 to 250 $m^2/g$, preferably in the range 25 to 150 $m^2/g$, with a pore volume which is, for example, in the range 0.4 to 0.8 $cm^3/g$. At least 75% of the porosity is contained in pores with an average diameter in the range 5 to 50 nanometers. A further type of support is silica with a specific surface area in the range 10 to 250 $m^2/g$ (before incorporation of palladium). Preferably, a catalyst is used which is very slightly acidic.

Methods for the preparation of the supported metallic phase are well known.

Sulphur is a required phase to ensure only a small amount of hydrogenation of the aromatic compounds to naphthenic compounds. Without this second phase, the side reaction which hydrogenates the aromatic compounds is too significant.

Without limiting the invention to these compounds alone, the compounds used can be sulphur-containing compounds, in particular organic sulphur-containing compounds which are decomposable during the treatments which activate the catalyst in the reactor.

Without limiting the process of the present invention, the organic sulphur-containing compounds which can be used are, for example, organic alkyl or aryl sulphides or organic alkylaryl or arylalkyl sulphides. Examples are butylethyl sulphide, diallyl sulphide, dibutyl sulphide, dipropyl sulphide, thiophene, dimethyl thiophene and ethylthiophene.

More generally, thiols (thioalcohols, mercaptans, thiophenols) can be used, with formula $R_1$—SH where $R_1$ is an organic radical, thioethers with formula $R_1$—S—$R_2$, where $R_1$ and $R_2$ are identical or different, or HO $R_1$—S—S—$R_2$—OH type disulphides, used either alone or in combination.

An organic sulphur-containing compound can also be selected from the group constituted by thiols, thiodiazoles, organic thioacids, thioamides, thioesters, and thiophenols. Examples are thiobenzoic acid, thiocresols, 3,3-thiodipropionitric acid, 2,3,6-trimethylthiophenol, methyl thioglycollate, naphthalene 2-thiol, phenyl isothiocyanate, 2-phenyl thiophenol, thioacetamide, thiobenzamide, 2,6-dimethyl thiophenol, 3,5-dimethylthiophenol, 2,2'-dinitrodiphenyl disulphide, 2,5-dithiodiurea, ethyl thioglycollate, 2-methoxy thiophenol, and 3-methoxy thiophenol.

The process of the invention can also be carried out in the presence of other types of sulphur-containing additives. Thus mercapto-alcohols can be used, with formula:

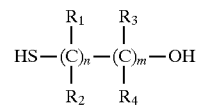

where n and m are whole numbers, $R_1$, $R_2$, $R_3$, and $R_4$, which may be identical or different, represent a hydrogen atom or an alkyl, aryl, aralkyl etc radical, containing 1 to 20, preferably 1 to 6 carbon atoms per molecule; preferably, n=–10 (for example 1–2) and m=1–10 (for example 1).

Monothioglycols can also be used, such as monothioethyleneglycol, dithioglycols such as dithiopropylene glycol, dithiobenzenes such as dithioresorcin, heterocycles substituted with mercapto groups such as mercaptopyridine, mercaptopyrimidine, etc., dihydroxyalkyl sulphides such as thiodiethylene glycol ($S(CH_2CH_2OH)_2$), thiodipropylene glycol, etc., diaryl sulphides such as diphenyl sulphide, diaralkyl sulphides such as dibenzyl sulphide, cyclic thioethers and their substituted derivatives (ethylene sulphide, thiophene, thiazole, thiopyrone, thioxanthone, thioxanthyhdrol, 1,4-thioxane, etc.), and S-alkyl ethers of heterocycles substituted with mercaptans (2-methylthio 4,6-diamino pyrimidine, etc.).

Particular examples of the above families of compounds are dimethylsulphoxide, ethylthiol ethanol, thioglycolic acid, dithioglycol and organic disulphides with formula HO—$R_1$—S—S—$R_2$—OH as indicated above or OH—$(CH_2)_x$—S—$(CH_2)_{x'}$—S—$(CH_2)_{x''}$—OH where $R_1$ and $R_2$ are defined above, and where x, x' and x", which may be identical or different, represent a whole number.

Particular examples are diethanol disulphide or 2,2-dithio bis ethanol (DEODS) with formula HO—$C_2H_4$—S—S—$C_2H_4$—OH, which is soluble in water, glycols and polyglycols.

A polysulphide with formula R—Sn—R' can also be used, where n is a whole number from 3 to 20 atoms, preferably 4 to 8 and more particularly 5 to 7, and R and R', which may be identical or different, represent organic radicals each containing 1 to 150 carbon atoms per molecule, preferably either 10 to 60 carbon atoms or 5 to 40 carbon atoms, and more particularly 7 to 16 carbon atoms, these radicals being selected from the group constituted by alkyl radicals, i.e., saturated or unsaturated, linear or branched, or naphthenic, aryl radicals, alkylaryl radicals and arylalkyl radicals, these various radicals possibly containing at least one heteroatom. R' may also be a hydrogen atom.

A preferred polysulphide is ditertiododecylpolysulphide (n=5) where R and R' are each a tertiododecyl radical. This product is sold by Elf Aquitaine under the trade name TPS 32, so named since it contains 32% by weight of sulphur. A further example is ditertiononylpolysulphide (n=5) where R and R' are each a tertiononyl radical.

The pretreating agent is used diluted in a suitable solvent, the nature of which depends primarily on the nature of the sulphuration agent. The solvent may be one of the following solvents, used alone or as a mixture:

- a light gasoline boiling, for example between about 60° C. and about 95° C.;
- a hexane type gasoline boiling between about 63° C. and 68° C.;
- an F type gasoline boiling between about 100° C. and 160° C. and generally containing 10% to 20% of aromatic hydrocarbons, for example 15%, by volume;
- a White spirit type gasoline, boiling between about 150° C. and about 250° C. and generally containing 14% to 22% of aromatic hydrocarbons, for example 17% by volume;
- or any cut, hydrocarbon or otherwise, which is equivalent to the above gasolines.

The agent can be used in another solvent such as alcohols (methanol, ethanol, propanol, etc.), aldehydes, ketones, ethers, esters, polyalcohols, acids and polyacids, or glycols. These solvents can be used alone or mixed with the solvents cited above (gasoline...). These compounds can also act as a reducing agent (for example the aldehydes). Water is a further possible solvent.

After impregnation, the catalyst is advantageously subjected to heat treatment, generally in the range 100° C. to 200° C.

In the hydrogenation process of the present invention, 0.05% to 1%, preferably 0.1% to 0.4% of sulphur, expressed as the weight of sulphur with respect to the weight of catalyst, is advantageously incorporated into the catalyst.

The presulphurated catalyst thus obtained is then activated in the reactor before introducing the feed. Activation is effected in a reducing atmosphere at a temperature in the range 20° C. to 300° C., preferably in the range 60° C. to 280° C., at pressures in the range 1 to 50 bar, preferably 3 to 20 bar, and an hourly volume ($m^3$) of feed per $m^3$ of catalyst (GHSV) in the range 50 to 600 $h^{-1}$, preferably in the range 100 to 200 $h^{-1}$.

The catalyst of the present invention is used in the hydrogenation of diolefins and possibly olefins in hydrocarbon cuts which are rich in aromatic compounds.

A variety of cuts can thus be used as the feed, with an aromatic compound content which is normally greater than 20% by weight, advantageously at least 50% by weight and which may be as much as 99% by weight. Non limiting examples of aromatic cuts which can be selectively hydrogenated are: reformates, $C_6$ or $C_6/C_7$ cuts which are rich in benzene (aromatic compound content of more than 50% by weight) and which may also be rich in benzene and in toluene, and an aromatic $C_8$ cut (xylenes+ethylbenzene).

Suitable feeds for use in the present invention are characterized by a bromine number of 10000 to 100 mg per 100 g of product to be treated. They preferably contain at most 0.3% by weight of polyolefinic hydrocarbons (generally diolefins) and/or acetylenic hydrocarbons.

In a preferred implementation of the present invention, a single catalytic hydrogenation reactor is used.

In a further implementation of the present invention, the process uses two or more catalytic hydrogenation reactors containing at least one catalytic reaction zone traversed by the totality of the feed to be hydrogenated and the required quantity of hydrogen which is necessary to effect the desired reactions.

The choice of operating conditions is important. In particular, the temperature and pressure conditions are such that the feed to be treated is at least partially (and preferably for the major part) liquid at the reactor inlet. Preferably, at least 80% by weight of the feed (including the hydrogen) is liquid at the reactor inlet.

The hydrogen and the feed to be treated are injected as an upflow or downflow into a reactor which preferably has a fixed catalyst bed. In a preferred implementation, an upflow of reactants is used.

A large excess of hydrogen can be used, with respect to the stoichiometry of the hydrogenation reactions of the olefins and diolefins present in the feed.

The use of large excesses of hydrogen is not prejudicial to selectivity, since using the catalyst of the present invention limits hydrogenation of the aromatics to less than 1500 ppm. However, it is preferable to use the smallest possible excess of hydrogen to reduce the costs associated with recycling the hydrogen. The hydrogen/polyolefinic and/or acetylenic compound molar ratios are in the range 0.3 to 100, preferably in the range 1 to 50.

The reaction temperature is generally in the range 50° C. to 250° C., preferably in the range 800° C. to 215° C., more preferably in the range 80° C. to 180° C.

The pressure is sufficient to maintain the major portion of the hydrocarbon cut which is rich in aromatic compounds in the liquid phase in the reactor, namely in the range 4 to 50 bars, preferably in the range 10 to 40 bars.

Under these conditions, the space velocity is in the range 0.2 to 25 $h^{-1}$, preferably in the range 1 to 20 $h^{-1}$, more preferably in the range 2 to 15 $h^{-1}$.

After hydrogenation, the degree of conversion of diolefins is greater than 75%, and usually greater than 90%. The degree of monoolefin conversion is adjusted depending on the specifications of the upstream processes or treatments, the availability of hydrogen and the means for separating the hydrogen not converted in the process.

The operating conditions are generally selected so that the degree of conversion of the aromatic compounds in the feed is less than 0.15%, preferably less than 0.1%.

The process of the present invention can be used to purify various hydrocarbon feeds in which the content and nature of the aromatics can vary within a wide range.

Some advantages of the process are:

the possibility of treating feeds characterized by high olefin and diolefin contents, also of treating feeds containing 0 to more than 3% by weight of olefins, and advantageously at most 0.3% by weight of dienes;

the aromatic compound content in the treated effluents remains practically unchanged after purification;

there is no production of high molecular weight compounds, the diolefins and any olefins being transformed into paraffins;

the environmental nuisance is significantly reduced since the catalyst can be regenerated at an acceptable cost and the non-hydrogenated olefins are the least deleterious to the upstream treatment processes, so there are no significant deposits of solid contaminated waste products;

the lifetime of the catalyst used in the process of the present invention is substantially higher than the lifetime of activated clays, thus increasing the profitability of the operation;

the volumes of the hydrogenation reactors are significantly reduced compared with reactors using activated clay, for the same efficiency, again reducing the operating costs.

In the foregoing and in the following examples, all temperatures are set forth uncorrected in degrees Celsius; and, unless otherwise indicated, all parts and percentages are be weight.

The entire disclosure of all applications, patents and publications, cited above and below, and of corresponding French application No. 95/00977, filed Jan. 27, 1995, are hereby incorporated by reference.

The following examples illustrate the invention.

EXAMPLES

Preparation and Activation of Catalysts

Catalyst A, not in Accordance with the Invention

A catalyst was prepared by dry impregnation of a nitric solution of palladium nitrate into a transition alumina support with a specific surface area of 70 $m^2/g$ and a pore volume of 0.6 cc/g in the form of spherules with diameters of 2 to 4 mm. The product was then dried at 120° C. for 6 hours then calcined in air at 450° C. for 2 hours. The product prepared using this method, catalyst A, contained 0.3% by weight of palladium.

Catalyst A was introduced into a reactor with a diameter of 3 cm then activated at a flow rate of 200 l/h of hydrogen at 250° C. for 2 hours.

Catalyst B not in Accordance with the Invention

Catalyst B was prepared as follows: Catalyst A was introduced into a reactor with a diameter of 3 cm then activated at a flow rate of 200 l/h of hydrogen and 6 l/h of hydrogen sulphide at 250° C. for 2 hours.

Catalyst C in Accordance with the Invention

200 $cm^3$ of catalyst A was dry impregnated with an aqueous solution of formic acid containing 2.2 moles per liter and diethanoldisulphide at a concentration of 0.02 moles per liter. The impregnated catalyst was dried for 6 hours at 120° C. Catalyst C prepared using this method was then introduced into a reactor with an internal diameter of 3 cm.

Catalyst C was activated at a flow rate of 200 l/h of hydrogen at 250° C. for 2 hours.

The diolefins and a portion of the olefins contained in an aromatic cut which was rich in compounds containing 8 carbon atoms per molecule were hydrogenated. The composition by weight of this feed is given in Table 1 below.

TABLE 1

| Composition of the aromatic $C_8$ cut | |
|---|---|
| Compounds | % by weight |
| Benzene | 0.11 |
| Toluene | 1.44 |
| Ethylbenzene | 12.86 |
| Para-xylene | 17.67 |
| Meta-xylene | 42.24 |
| Ortho-xylene | 19.73 |
| $C_9$ aromatic | 1.60 |
| $C_{10+}$ aromatic | 0.00 |
| $C_{5+}$ PON* | 4.35 |

*PON: paraffins + olefins + naphthenes

The concentration of diolefins and olefins in the feed corresponded to a bromine number of 250 mg/100 g. Assuming an average molecular weight of olefins and diolefins of 110, the weight content of olefins and diolefins was estimated to be 0.172%. A diolefin content of 300 to 400 ppm was estimated on the basis of a MAV (maleic anhydride value) which was at the detection limit: 0.3 mg/g. This test corresponded to the conjugated diolefin content. Thus it could be deduced that the olefin content was 1320 to 1420 ppm. An acid wash color test for this feed gave a result of 9+. The test provided an estimate of the quantity of products which could form gums.

Hydrogenation of the feed was carried out using the three catalysts A, B and C under the following variable conditions:

Hourly space velocity : 1 to 4 $h^{-1}$;

Temperature : 80° C. to 250° C.;

Total pressure : 20 to 30 bars;

Hydrogen/olefins : 0.3 to 93 moles per mole.

EXAMPLES 1 to 8

Comparative Examples

The results shown in Table 2 were obtained using catalyst A which was not in accordance with the present invention. Over the entire range of temperature, GHSV and $H_2$/olefin molar ratio examined, there was seen to be a loss of aromatic compounds.

TABLE 2

Bromine numbers, Acid Wash Color test and loss of aromatic compounds as a function of hydrogenation test conditions in the presence of catalyst A.

| Ex | BrN mg/100 g | $H_2$/olefins mol/mol | T °C. | GHSV l/l/h | AWC | Loss of aros ppm |
|---|---|---|---|---|---|---|
| 1 | 211 | 11.6 | 120 | 4 | 5− | 300 |
| 2 | 198 | 11.6 | 150 | 4 | 4+ | 500 |
| 3 | 191 | 11.6 | 180 | 4 | 4 | 4600 |
| 4 | 189 | 11.6 | 180 | 4 | 4 | 4200 |
| 5 | 178 | 23.0 | 180 | 4 | 3− | 10900 |

TABLE 2-continued

Bromine numbers, Acid Wash Color test and loss of aromatic compounds as a function of hydrogenation test conditions in the presence of catalyst A.

| Ex | BrN mg/100 g | $H_2$/olefins mol/mol | T °C. | GHSV l/l/h | AWC | Loss of aros ppm |
|---|---|---|---|---|---|---|
| 6 | 175 | 44.6 | 180 | 4 | 3 | 23600 |
| 7 | 168 | 23.0 | 215 | 4 | 3− | 21600 |
| 8 | 161 | 23.0 | 250 | 4 | 3− | 24800 |

BrN = bromine number;
GHSV = space velocity in liters of feed per liter of catalyst per hour.

EXAMPLES 9 to 17

Comparative Examples

The results in Examples 9 to 17, shown in Table 3, were obtained with catalyst B which was not in accordance with the present invention. Compared with catalyst A, it can be seen that the loss of aromatic compounds was significantly reduced.

TABLE 3

Bromine numbers, Acid Wash Color test and loss of aromatic compounds as a function of hydrogenation test conditions in the presence of catalyst B.

| Ex | BrN mg/100 g | $H_2$/olefins mol/mol | T °C. | GHSV l/l/h | AWC | Loss of aros ppm |
|---|---|---|---|---|---|---|
| 9  | 216 | 11.6 | 180 | 4 | 5+ | 0 |
| 10 | 214 | 11.6 | 180 | 4 | 5+ | 0 |
| 11 | 186 | 23.0 | 180 | 4 | 3− | 0 |
| 12 | 186 | 23.0 | 180 | 4 | 3− | 0 |
| 13 | 144 | 23.0 | 180 | 2 | 2+ | 0 |
| 14 | 127 | 44.6 | 180 | 2 | 2  | 0 |
| 15 | 206 | 44.6 | 180 | 2 | 5  | 300 |
| 16 | 94  | 93.0 | 180 | 1 | 1+ | 500 |
| 17 | 68  | 93.0 | 215 | 1 | 1  | 1300 |

BrN = bromine number;
GHSV = space velocity in liters of feed per liter of catalyst per hour.

EXAMPLES 18 to 29

Examples in Accordance with the Invention

Examples 18 to 29 show the superiority of the process of the present invention in the presence of catalyst C containing 0.3% by weight of palladium and 0.12% by weight of sulphur introduced in an organic form. The differences between the results shown in Table 4 below and those obtained with catalyst A are indisputable. The aromatic compound loss using the process of the present invention was far lower than that of catalyst A.

Examination of the differences between the results obtained with catalyst B and catalyst C shows that catalyst C was far superior as regards activity. Examples 10 and 21, for example, were carried out under the same conditions of $H_2$/olefin ratio, temperature and GHSV. Under these conditions, catalyst C was at least twice as active as catalyst B. This is shown by comparing Examples 14 and 21 where, while catalyst B operated with a $H_2$/olefin ratio which was far higher and a GHSV which was half that of catalyst C, catalyst C exhibited the greatest activity.

Examples 18 to 29 below show the clear advantage of the present invention in the hydrogenation of diolefinic and olefinic compounds with a very low aromatic compound loss.

TABLE 4

Bromine numbers, Acid Wash Color test and loss of aromatic compounds as a function of hydrogenation test conditions in the presence of catalyst C in accordance with the present invention.

| Ex | BrN mg/100 g | $H_2$/olefins mol/mol | T °C. | GHSV l/l/h | AWC | Loss of aros ppm |
|---|---|---|---|---|---|---|
| 18 | 186 | 3.3  | 170 | 4 | 3+ | 0 |
| 19 | 204 | 0.3  | 170 | 4 | 4+ | 0 |
| 20 | 127 | 11.6 | 170 | 4 | 2  | 0 |
| 21 | 116 | 11.6 | 180 | 4 | 2− | 0 |
| 22 | 60  | 23.0 | 180 | 2 | 1  | 0 |
| 23 | 34  | 44.6 | 180 | 1 | 1− | 100 |
| 24 | 59  | 93.0 | 180 | 4 | 1  | 200 |
| 25 | 162 | 93.0 | 150 | 4 | 3− | 0 |
| 26 | 212 | 93.0 | 110 | 4 | 5  | 0 |
| 27 | 27  | 93.0 | 215 | 4 | 1− | 400 |
| 28 | 26  | 93.0 | 215 | 4 | 1− | 500 |
| 29 | 26  | 93.0 | 250 | 4 | 1− | 2200 |

BrN = bromine number;
GHSV = space velocity in liters of feed per liter of catalyst per hour.

EXAMPLES 30–34

In Accordance with the Present Invention

The examples below show the effectiveness of the present invention in treating an aromatic $C_6$ cut for the extraction of benzene. There were two aims to the treatment of the feed shown in Table 5: either hydrogenation of only the solutions in the feed, or hydrogenation of the diolefins and a large portion of the olefins without a loss of benzene in the form of cyclohexane.

TABLE 5

Composition of the aromatic $C_6$ cut.
The bromine number calculated for the feed was
1849 mg/100 g

| Compounds | % by weight |
|---|---|
| Benzene | 66.5 |
| Toluene | 0.0016 |
| Cyclohexane | 0.0417 |
| Olefins | 0.9584 |
| Diolefins | 0.0154 |
| Alkanes | 34.4305 |

The compound concentrations were measured using chromatography (detection limit 0.0003% by weight); the hexadienes (exact structures not identified) were identified by their mass and decomposition spectra, 82 g/mole (linear dienes) and 80 g/mole (cyclic dienes).

Catalyst C prepared using the method indicated above was activated at a flow rate of 200 /h of hydrogen at 250° C. for 2 hours.

The process of the present invention for the hydrogenation of the diolefins and possibly the olefins using catalyst C was carried out under the following conditions:

Hourly space velocity : 2 to 16 $h^{-1}$;

Temperature : 80° C. to 170° C.;

Total pressure : 20 bars;

Hydrogen/olefins : 0.7 to 20 moles per mole.

The results shown in Table 6 show the effectiveness of the process of the present invention in the hydrogenation of diolefins, even under very mild conditions of $H_2$/olefin ratio, temperature and space velocity. The present invention also allows the conversion of a large portion of the olefins in the feed while ensuring a small loss of benzene.

TABLE 6

Olefin and diolefin contents, calculated bromine number and benzene loss in a $C_6$ aromatic cut after hydrogenation using the process of the present invention

| Ex | $H_2$/olfns mol/mol | T °C. | GHSV l/l/h | Diolefins wt % | Olefins wt % | BrN mg/ 100 g | Loss of benzene ppm |
|----|------|-----|----|---------|--------|------|-----|
| 30 | 2.3  | 170 | 8  | <0.0003 | 0.4332 | 206  | 47  |
| 31 | 1.4  | 150 | 8  | <0.0003 | 0.6853 | 325  | 24  |
| 32 | 20.0 | 170 | 2  | <0.0003 | 0.0758 | 144  | 254 |
| 33 | 0.7  | 80  | 16 | <0.0003 | 0.8022 | 1523 | 6   |
| 34 | 1.4  | 80  | 8  | <0.0003 | 0.6874 | 1305 | 46  |

BrN = bromine number

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

We claim:

1. A process for the selective high-efficiency hydrogenation of an at least partially liquid phase aromatic hydrocarbon cut comprising monoolefinic hydrocarbons and polyolefinic and/or acetylenic hydrocarbons with a bromine number of 10000 to 100 mg per 100 g of product, wherein the aromatic degree of conversion in the process is no more than 0.15 % by weight, comprising contacting the cut and hydrogen in a hydrogenation zone in contact with a catalyst containing 0.1% to 1% by weight (with respect to the support) of palladium, the catalyst having been treated before activation with at least one organic sulphur-containing compound to introduce 0.05% to 1% of sulphur (by weight with respect to the weight of the catalyst).

2. A process according to claim 1, wherein the support is selected from the group formed by alumina, silica, and silica-aluminas.

3. A process according to claim 1, wherein the organic sulphur-containing compounds are organic sulphur-containing compounds which are decomposable under conditions which activate the catalyst in the reactor.

4. A process according to claim 1, wherein the sulphur-containing compound is selected from the group consisting of organic alkyl or aryl sulphides, organic alkylaryl or arylalkyl sulphides, thiols, thiodiazoles, organic thioacids, thioamides, thioesters, thiophenols, mercapto-alcohols, monothiolglycols, and thioethers.

5. A process according to claim 1, wherein the sulphur-containing compound is selected form the group consisting of 2,2-dithiobis-ethanol, ditertiododecylpolysulphide, and diethanoldisulphide.

6. A process according to claim 1, wherein the sulphur-containing compound is diluted by a solvent selected from the group consisting of gasolines and hydrocarbon cuts.

7. A process according to any one of claim 1, wherein the sulphur-containing compound is diluted by a solvent selected from the group consisting of alcohols, aldehydes, ketones, ethers, esters, polyalcohols, acids, polyacids, and glycols.

8. A process according to any one of claim 1, wherein the sulphur-containing compound is diluted by a solvent which is water.

9. A process according to claim 1, wherein the catalyst contains 0.05% to 1% by weight of sulphur.

10. A process according to claim 1, wherein the catalyst which has been treated with at least one organic sulphur-containing compound is activated in a hydrogenation zone at a temperature in the range 20° C. to 300° C., a pressure in the range 1 bar to 50 bars and a GHSV in the range 50–600 $h^{-1}$, in the presence of hydrogen, before passage of the hydrocarbon cut to be hydrogenated.

11. A process according to claim 1, wherein it is carried out at a pressure in the range 4 to 50 bars, a temperature in the range 50° C. to 250° C., and at a GHSV which is stable in the range 0.2 to 25 $h^{-1}$.

12. A process according to claim 1, wherein the sulfur-containing compound is not $H_2S$, $H_2Se$ or $H_2Te$.

13. A process according to claim 1, wherein the sulfur-containing compound is a polysulfide.

14. A process according to claim 1, wherein the sulfur-containing compound is a polysulfide of the formula R—Sn—R', wherein n is 3–20 and R and R' are each independently an organic radical with 1–150 carbon atoms which is a saturated or unsaturated alkyl radical, a naphthenic radical, an aryl radical, an alkylaryl radical or an arylalkyl radical, each optionally containing at least one heteroatom, or R' may be H.

15. A process according to claim 1, wherein the sulfur-containing compound is a disulfide of the formula

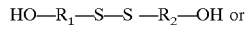

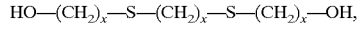

wherein $R_1$ and $R_2$ are each independently H or an alkyl, aryl, or aralkyl radical of 1–20 carbon atoms, and each x is independently a whole number.

16. A process according to claim 15, wherein presulfurization of the catalyst is performed in the presence of a reducing agent.

17. A process according to claim 15, wherein the sulfur containing compound is diethanoldisulfide.

18. A process for the selective high-efficiency hydrogenation of an aromatic hydrocarbon cut containing monoolefinic hydrocarbons and polyolefinic and/or acetylenic hydrocarbons with a bromine number of 10000 to 100 mg per 100 g of products said process producing an aromatic degree of conversion limited to a maximum of 0.15% by weight, comprising contacting the cut, which is at least partially in the liquid phase, with hydrogen in a hydrogenation zone in contact with a catalyst containing 0.1% to 1% by weight (with respect to the support) of palladium, the catalyst having been treated before activation with at least one organic sulphur-containing compound to introduce 0.05% to 1% of sulphur (by weight with respect to the weight of the catalyst), the process being carried out at a temperature in the range 20° C. to 250° C., at a pressure of 4–50 bar, a GHSV of 0.2–25 $h^{-1}$ and with a $H_2$/monoolefin+ polyolefin and/or acetylenes ratio in the range 0.3 to 100.

* * * * *